United States Patent
Suzuki

(10) Patent No.: US 8,593,740 B2
(45) Date of Patent: Nov. 26, 2013

(54) RETROFOCUS-TYPE WIDE ANGLE LENS AND CAMERA INCLUDING THE LENS

(75) Inventor: Takashi Suzuki, Saitama (JP)

(73) Assignee: Fujifilm Corporation, Tokyo (JP)

( * ) Notice: Subject to any disclaimer, the term of this patent is extended or adjusted under 35 U.S.C. 154(b) by 186 days.

(21) Appl. No.: 13/230,018

(22) Filed: Sep. 12, 2011

(65) Prior Publication Data

US 2012/0063011 A1    Mar. 15, 2012

(30) Foreign Application Priority Data

Sep. 14, 2010   (JP) .................................. 2010-205085

(51) Int. Cl.
*G02B 9/12*    (2006.01)
*G02B 13/04*   (2006.01)
*G02B 9/14*    (2006.01)

(52) U.S. Cl.
USPC ............ 359/784; 359/753; 359/787; 359/788

(58) Field of Classification Search
USPC .................................. 359/753, 784, 787, 788
See application file for complete search history.

(56) References Cited

U.S. PATENT DOCUMENTS

| 6,694,202 B2 | 2/2004 | Miyazaki |
| 6,697,202 B2 | 2/2004 | Mori |
| 6,894,847 B2 | 5/2005 | Suzuki |
| 7,423,819 B1 * | 9/2008 | Chuang et al. ................ 359/753 |

FOREIGN PATENT DOCUMENTS

JP    2002214526    7/2002

* cited by examiner

*Primary Examiner* — William Choi
(74) *Attorney, Agent, or Firm* — Young & Thompson

(57) ABSTRACT

A retrofocus-type wide angle lens includes a first lens group having negative refractive power as a whole, a second lens group having positive refractive power as a whole, a stop, and a third lens group having positive refractive power as a whole, which are arranged in this order from the object side of the retrofocus-type wide angle lens. Further, the first lens group includes two negative meniscus lenses, each having a convex surface facing the object side. Further, each of the second lens group and the third lens group includes a three-element cemented lens.

10 Claims, 8 Drawing Sheets

EXAMPLE 1

EXAMPLE 2

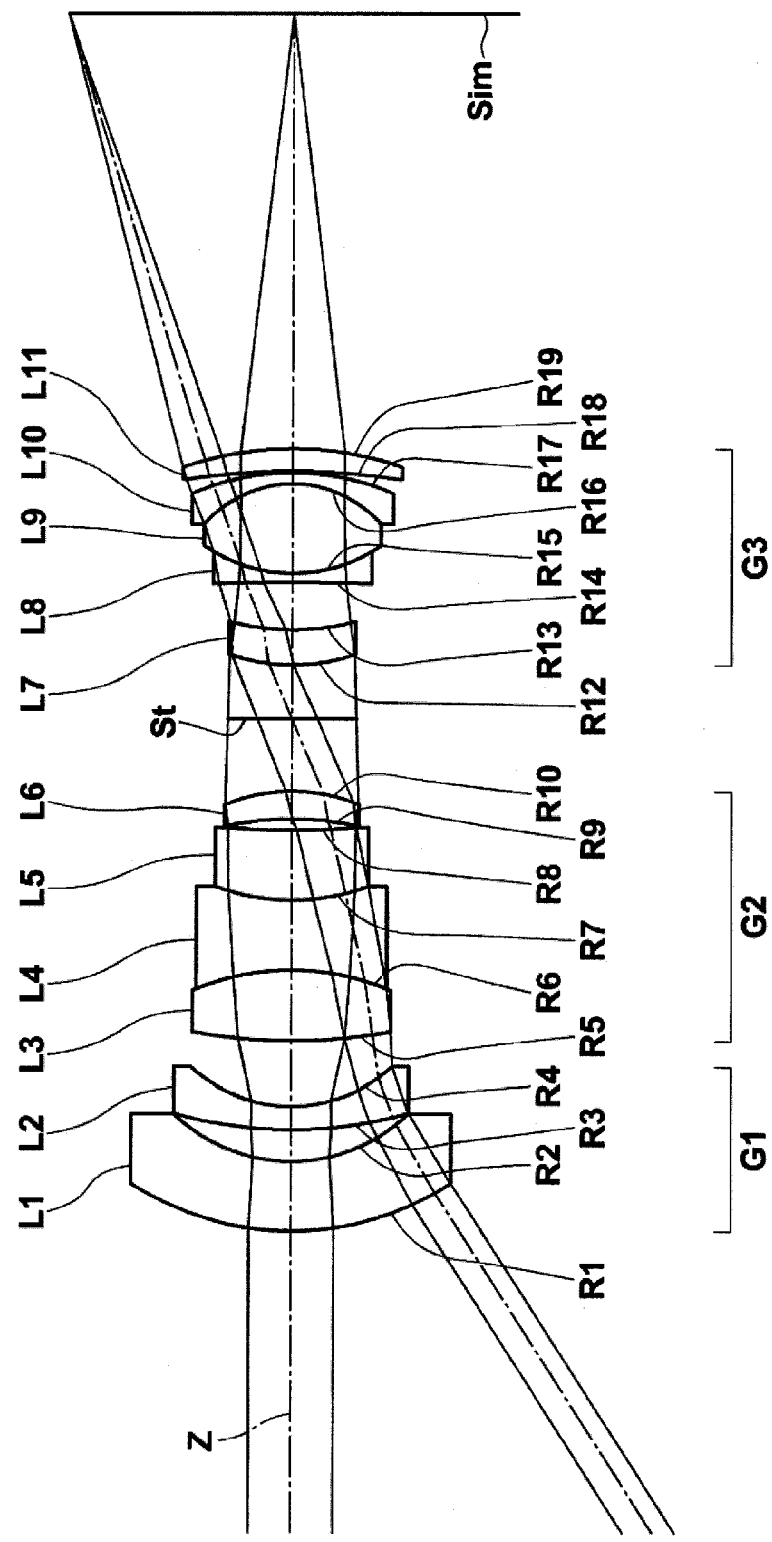
FIG.3 EXAMPLE 3

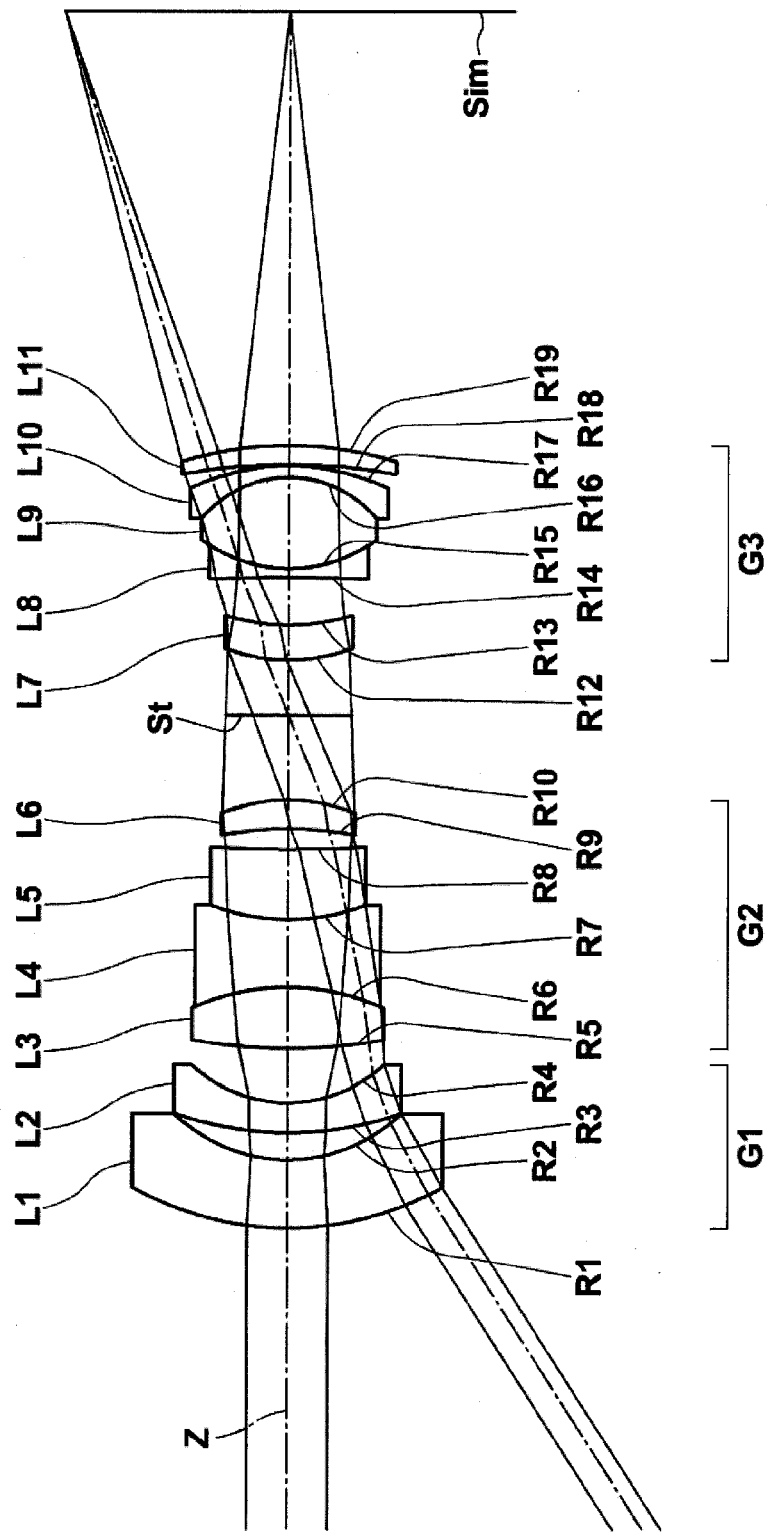

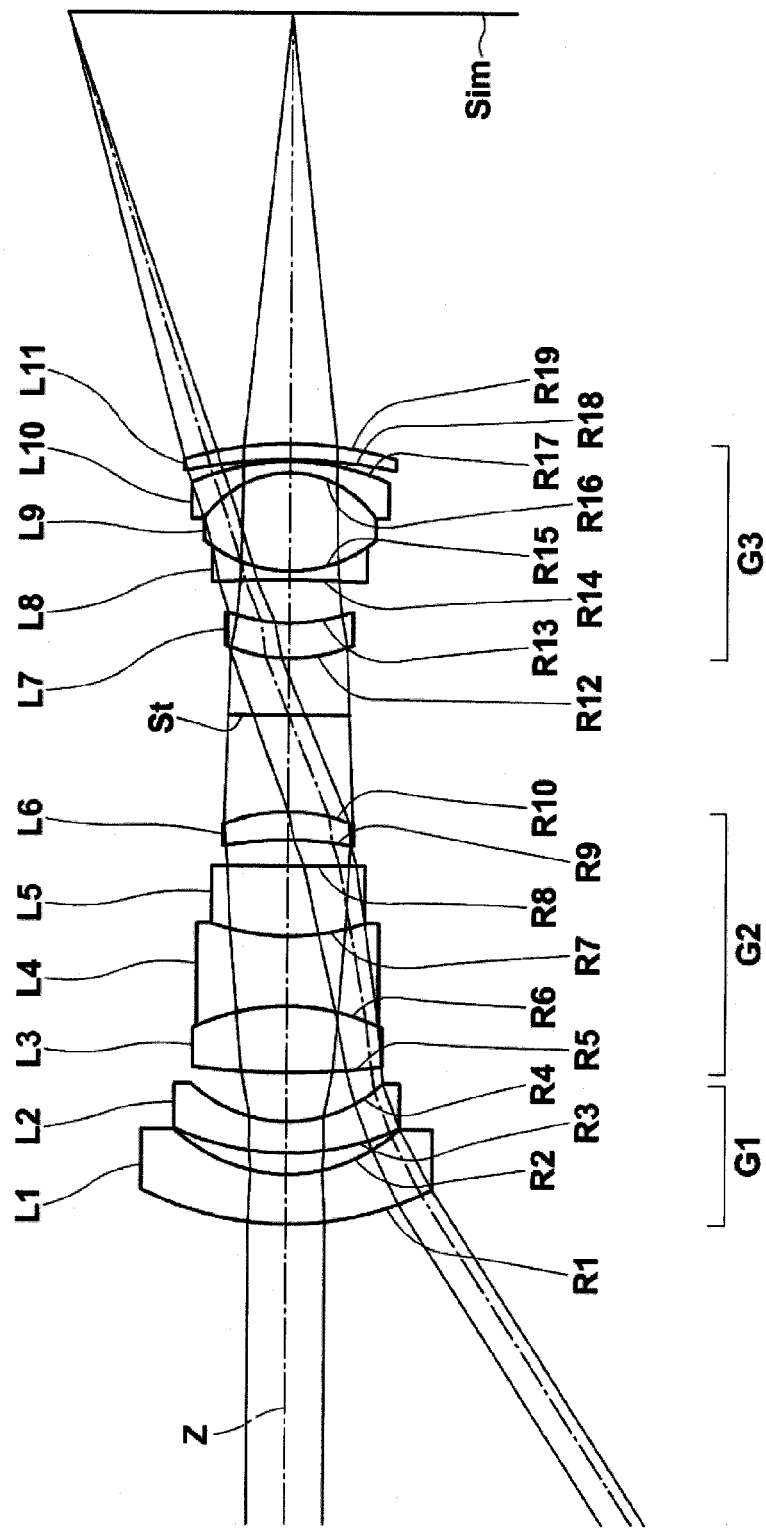
FIG.5 EXAMPLE 5

EXAMPLE 1

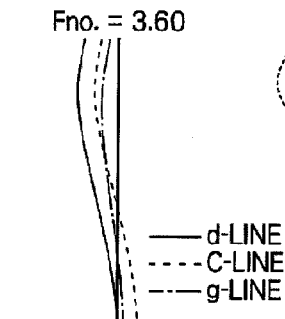

Fno. = 3.60
—— d-LINE
---- C-LINE
-·-·- g-LINE

-0.2mm  0.2mm
SPHERICAL
ABERRATION
FIG. 6A

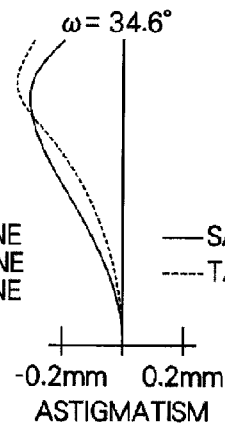

ω = 34.6°
—— SAGITTAL
----- TANGENTIAL

-0.2mm  0.2mm
ASTIGMATISM
FIG. 6B

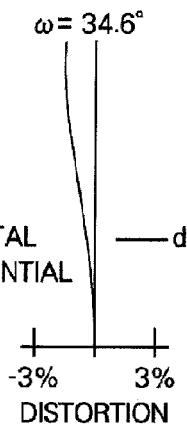

ω = 34.6°
—— d-LINE

-3%   3%
DISTORTION
FIG. 6C

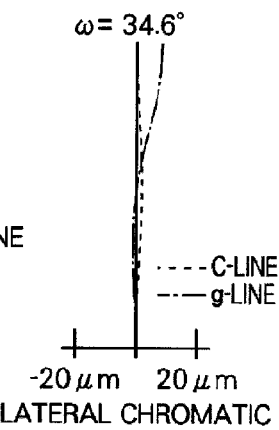

ω = 34.6°
---- C-LINE
-·-·- g-LINE

-20 μm  20 μm
LATERAL CHROMATIC
ABERRATION
FIG. 6D

EXAMPLE 2

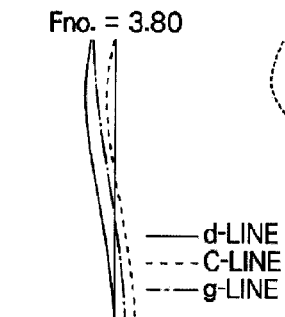

Fno. = 3.80
—— d-LINE
---- C-LINE
-·-·- g-LINE

-0.2mm  0.2mm
SPHERICAL
ABERRATION
FIG. 7A

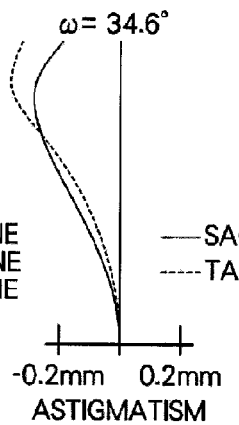

ω = 34.6°
—— SAGITTAL
----- TANGENTIAL

-0.2mm  0.2mm
ASTIGMATISM
FIG. 7B

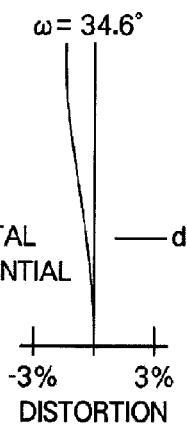

ω = 34.6°
—— d-LINE

-3%   3%
DISTORTION
FIG. 7C

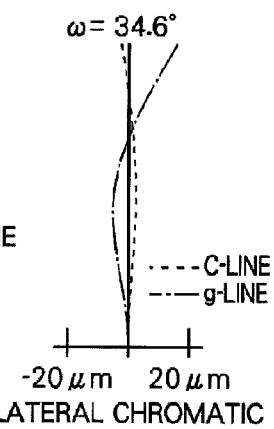

ω = 34.6°
---- C-LINE
-·-·- g-LINE

-20 μm  20 μm
LATERAL CHROMATIC
ABERRATION
FIG. 7D

EXAMPLE 3

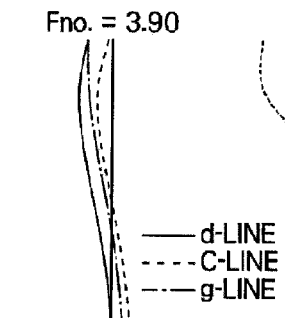

Fno. = 3.90
—— d-LINE
---- C-LINE
-·-·- g-LINE

-0.2mm  0.2mm
SPHERICAL
ABERRATION
FIG. 8A

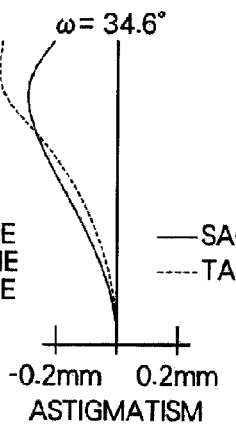

ω = 34.6°
—— SAGITTAL
----- TANGENTIAL

-0.2mm  0.2mm
ASTIGMATISM
FIG. 8B

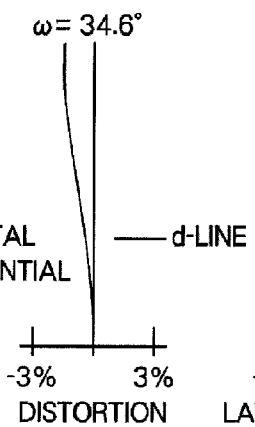

ω = 34.6°
—— d-LINE

-3%   3%
DISTORTION
FIG. 8C

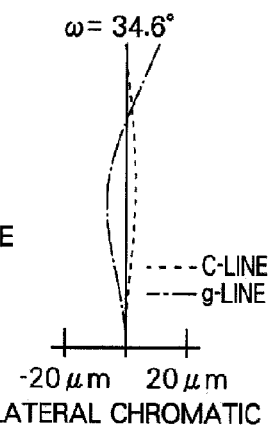

ω = 34.6°
---- C-LINE
-·-·- g-LINE

-20 μm  20 μm
LATERAL CHROMATIC
ABERRATION
FIG. 8D

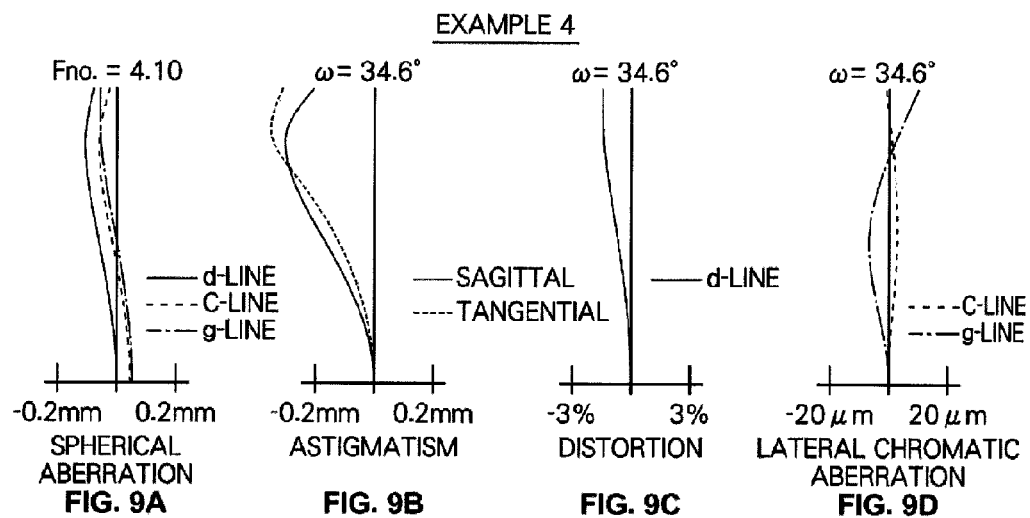
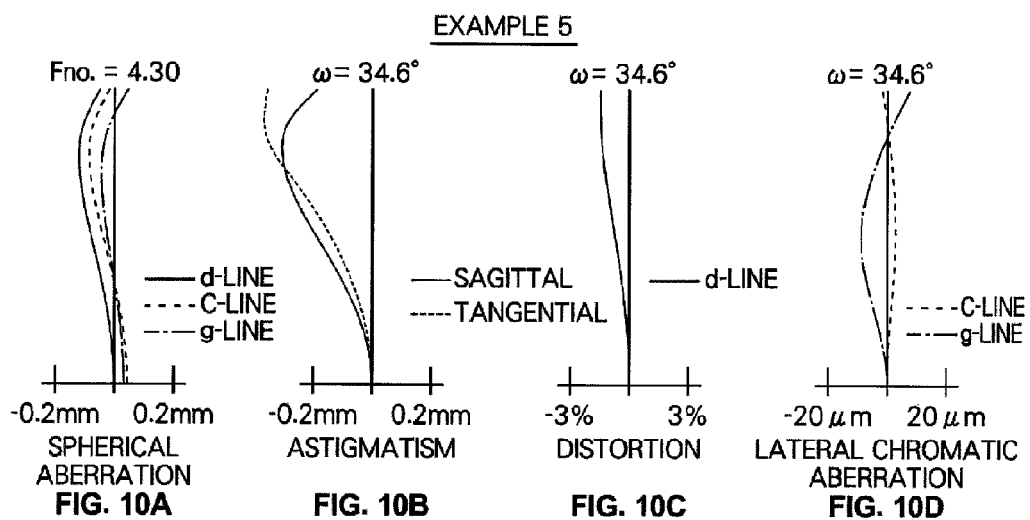

RETROFOCUS-TYPE WIDE ANGLE LENS AND CAMERA INCLUDING THE LENS

BACKGROUND OF THE INVENTION

1. Field of the Invention

The present invention relates to a retrofocus-type wide angle lens and a camera including the retrofocus-type wide angle lens. In particular, the present invention relates to a retrofocus-type wide angle lens having long back focus, which is appropriate for use for example in a medium-size single-lens reflex camera, and a camera including the retrofocus-type wide angle lens.

2. Description of the Related Art

Generally, a wide angle lens for a single-lens reflex camera needs to have a sufficient back focus. Therefore, many wide angle lenses for single-lens reflex cameras adopt retrofocus-type lens structure, in which a negative lens group and a positive lens group are arranged in this order from the object side and the front side and the rear side of the lens system are asymmetric with respect to a stop. Such retrofocus-type wide angle lenses are disclosed, for example, in Japanese Unexamined Patent Publication No. 2002-214526 (Patent Document 1), U.S. Pat. No. 6,697,202 (Patent Document 2), and U.S. Pat. No. 6,894,847 (Patent Document 3).

The retrofocus-type lens is appropriate to secure a long back focus. However, since the retrofocus-type lens is asymmetric with respect to the stop as described above, it is difficult to correct aberrations related to angles of view, especially, lateral chromatic aberrations. Meanwhile, digital cameras became widely used in recent years. When a digital back or the like is mounted on a camera to replace a film, more excellent correction of lateral chromatic aberrations is required because of the light receiving characteristics of the digital back or the like. In the lenses disclosed in Patent Documents 1 through 3, correction of lateral chromatic aberrations is not sufficient. For example, in Patent Document 1, it appears that lateral chromatic aberrations are corrected by using two lenses made of special low-dispersion glass in a rear lens group. However, correction of the aberrations is insufficient.

SUMMARY OF THE INVENTION

In view of the foregoing circumstances, it is an object of the present invention to provide a retrofocus-type wide angle lens with high optical performance, and which has a long back focus, and in which lateral chromatic aberrations are corrected in an excellent manner. Further, it is another object of the present invention to provide a camera including the retrofocus-type wide angle lens.

A retrofocus-type wide angle lens according to a first aspect of the present invention is a retrofocus-type wide angle lens comprising:

a first lens group having negative refractive power as a whole;

a second lens group having positive refractive power as a whole;

a stop; and a third lens group having positive refractive power as a whole, which are arranged in this order from the object side of the retrofocus-type wide angle lens, wherein the first lens group includes two negative meniscus lenses, each having a convex surface facing the object side, and wherein each of the second lens group and the third lens group includes a three-element cemented lens.

In the retrofocus-type wide angle lens according to the first aspect of the present invention, it is desirable that the three-element cemented lens in the third lens group is composed of a negative lens having a concave surface facing the image side of the retrofocus-type wide angle lens, a positive lens of double-convex shape, and a negative meniscus lens having a concave surface facing the object side, which are cemented together in this order from the object side.

In the retrofocus-type wide angle lens according to the first aspect of the present invention, it is desirable that the three-element cemented lens in the second lens group is composed of a positive lens of double-convex shape, a negative lens of double-concave shape, and a positive lens having a convex surface facing the object side, which are cemented together in this order from the object side.

In a retrofocus-type wide angle lens according to the first aspect of the present invention, it is desirable that the three-element cemented lens in the third lens group is composed of a negative lens, a positive lens, and a negative lens, which are cemented together in this order from the object side, and that at least one of the following formulas (1) and (2) is satisfied:

$$\nu 3p > 75 \tag{1}, \text{and}$$

$$Nd31 - Nd32 > 0.13 \tag{2}, \text{where}$$

$\nu 3p$: Abbe number of the positive lens in the three-element cemented lens in the third lens group with respect to d-line, Nd31: refractive index of one of the two negative lenses in the three-element cemented lens in the third lens group, and the one of the two negative lenses having higher refractive index than the other negative lens with respect to d-line, and Nd32: refractive index of the positive lens in the three-element cemented lens in the third lens group with respect to d-line.

In a retrofocus-type wide angle lens according to the first aspect of the present invention, it is desirable that the three-element cemented lens in the second lens group is composed of a positive lens, a negative lens, and a positive lens, which are cemented together in this order from the object side, and that the following formula (3) is satisfied:

$$Nd21 - Nd22 > 0.15 \tag{3}, \text{where}$$

Nd21: refractive index of one of the two positive lenses in the three-element cemented lens in the second lens group, and the one of the two positive lenses having higher refractive index than the other positive lens with respect to d-line, and Nd22: refractive index of the negative lens in the three-element cemented lens in the second lens group with respect to d-line.

In a retrofocus-type wide angle lens according to the first aspect of the present invention, it is desirable that a meniscus lens having a convex surface facing the stop is arranged between the three-element cemented lens in the second lens group and the stop.

In a retrofocus-type wide angle lens according to the first aspect of the present invention, it is desirable that a meniscus lens having a convex surface facing the stop is arranged between the three-element cemented lens in the third lens group and the stop.

A retrofocus-type wide angle lens according to a second aspect of the present invention is a retrofocus-type wide angle lens comprising:

a first lens group having negative refractive power as a whole;

a second lens group having positive refractive power as a whole;

a stop; and a third lens group having positive refractive power as a whole, which are arranged in this order from the object side of the retrofocus-type wide angle lens, wherein the second lens group includes a three-element cemented lens, and wherein the three-element cemented lens is composed of a positive lens of double-convex shape, a negative lens of double-concave shape, and a positive lens having a convex surface facing the object side, which are cemented together in this order from the object side, and wherein the following formula (3) is satisfied:

$$Nd21-Nd22>0.15 \qquad (3),$$ where

Nd21: refractive index of one of the two positive lenses in the three-element cemented lens in the second lens group, and the one of the two positive lenses having higher refractive index than the other positive lens with respect to d-line, and Nd22: refractive index of the negative lens in the three-element cemented lens in the second lens group with respect to d-line.

In a retrofocus-type wide angle lens according to the second aspect of the present invention, it is desirable that a meniscus lens having a convex surface facing the stop is arranged between the three-element cemented lens in the second lens group and the stop.

In a retrofocus-type wide angle lens according to either the first or second aspect of the present invention, it is desirable that focus is adjusted from an infinity object to a short distance object by moving the third lens group toward the object side.

In the retrofocus-type wide angle lens according to either the first or second aspect of the present invention and embodiments thereof, the sign (positive or negative) of the refractive power of a lens and the shape of the lens are considered in a paraxial region of the lens when the lens is an aspheric lens.

A camera according to the present invention includes a retrofocus-type wide angle lens according to either the first or second aspect of the present invention.

According to a first retrofocus-type wide angle lens of the present invention, a negative lens group, a positive lens group and a positive lens group are arranged in this order from the object side of the retrofocus-type wide angle lens. Further, the structure of a lens or lenses included in each of the lens groups is appropriately set. Therefore, it is possible to secure a long back focus, and high optical performance is achievable by correcting lateral chromatic aberrations in an excellent manner.

According to a second retrofocus-type wide angle lens of the present invention, a negative lens group, a positive lens group and a positive lens group are arranged in this order from the object side of the retrofocus-type wide angle lens. Further, the structure of lenses included in the second lens group is appropriately set, and a predetermined formula is satisfied. Therefore, it is possible to secure a long back focus, and high optical performance is achievable by correcting lateral chromatic aberrations in an excellent manner.

Further, since a camera of the present invention includes the first or second retrofocus-type wide angle lens, an embodiment, for example, as a single-lens reflex camera or the like is possible. Further, an excellent image is obtainable at a wide angle of view.

In the specification of the present application, the expression "a lens substantially consisting of n lenses or n lens groups" includes lenses which are equipped with: lenses substantially without any power; optical elements other than lenses, such as apertures and glass covers; and mechanical components, such as lens flanges, lens barrels, imaging elements, and camera shake correcting mechanisms; in addition to then lenses or n lens groups.

BRIEF DESCRIPTION OF THE DRAWINGS

FIG. 3 is a cross section of a retrofocus-type wide angle lens in Example 3 of the present invention illustrating lens structure and optical paths;

FIG. 4 is a cross section of a retrofocus-type wide angle lens in Example 4 of the present invention illustrating lens structure and optical paths;

FIG. 5 is a cross section of a retrofocus-type wide angle lens in Example 5 of the present invention illustrating lens structure and optical paths;

FIGS. 6A, 6B, 6C and 6D are diagrams illustrating aberrations of the retrofocus-type wide angle lens in Example 1 of the present invention;

FIGS. 7A, 7B, 7C and 7D are diagrams illustrating aberrations of the retrofocus-type wide angle lens in Example 2 of the present invention;

FIGS. 8A, 8B, 8C and 8D are diagrams illustrating aberrations of the retrofocus-type wide angle lens in Example 3 of the present invention;

FIGS. 9A, 9B, 9C and 9D are diagrams illustrating aberrations of the retrofocus-type wide angle lens in Example 4 of the present invention;

FIGS. 10A, 10B, 10C and 10D are diagrams illustrating aberrations of the retrofocus-type wide angle lens in Example 5 of the present invention.

DESCRIPTION OF THE PREFERRED EMBODIMENTS

Hereinafter, embodiments of the present invention will be described with reference to drawings. FIGS. 1 through 5 are cross sections illustrating the structure of a retrofocus-type wide angle lens according to a first embodiment of the present invention. FIGS. 1 through 5 correspond to Examples 1 through 5, which will be described later. In FIGS. 1 through 5, the left side is an object side, and the right side is an image side. Further, axial rays of light from an object located at an infinite distance (at infinity) and off-axial rays of light at a maximum angle of view are also illustrated. In FIGS. 1 through 5, the sign "Ri" (i is an integer) represents a radius of curvature, which will be described later in detail in the descriptions of examples. Since the basic structures of examples illustrated in FIGS. 1 through 5 and the manner of illustration are the same, the present invention will be described mainly with reference to FIG. 1 as a representative example.

A retrofocus-type wide angle lens according to the first embodiment of the present invention includes first lens group G1 having negative refractive power as a whole, second lens group G2 having positive refractive power as a whole, aperture stop St, and third lens group G3 having positive refractive power as a whole, which are arranged along optical axis Z in this order from the object side of the retrofocus-type wide angle lens. Further, the first lens group G1 includes at least two negative meniscus lenses, each having a convex surface facing the object side. Further, each of the second lens group G2 and the third lens group G3 includes at least one three-element cemented lens, which is a set of three lenses cemented together. Aperture stop St illustrated in FIG. 1 does not necessarily represent the size nor the shape of the stop, but represents the position of the aperture stop St on the optical axis Z.

In the retrofocus-type wide angle lens, a lens group having negative refractive power, a lens group having positive refractive power and a lens group having positive refractive power are arranged in this order from the object side. Therefore, it is possible to obtain a long back focus. Further, the structure in which the first lens group G1 includes at least two negative meniscus lenses, each having a convex surface facing the object side, is advantageous to achievement of a wide angle and a long back focus. Further, the structure in which each of the second lens group G2 and the third lens group G3 on either side of the aperture stop St includes at least one three-element cemented lens is advantageous to correction of chromatic aberrations. The structure is especially advantageous to correction of lateral chromatic aberrations, which are specific to wide angle lenses.

Figure 1:
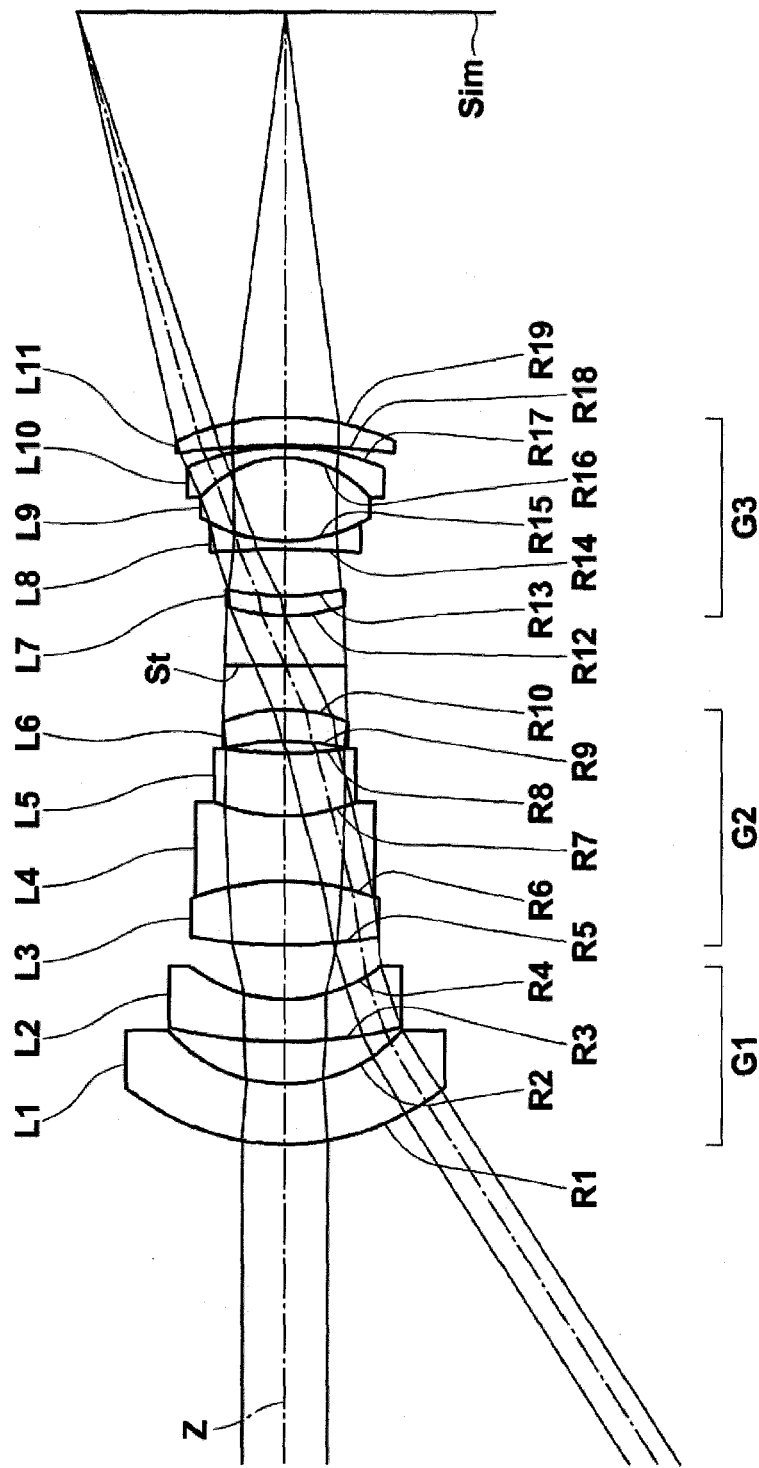
FIG. 1 is a cross section of a retrofocus-type wide angle lens in Example 1 of the present invention illustrating lens structure and optical paths.
Figure 2:
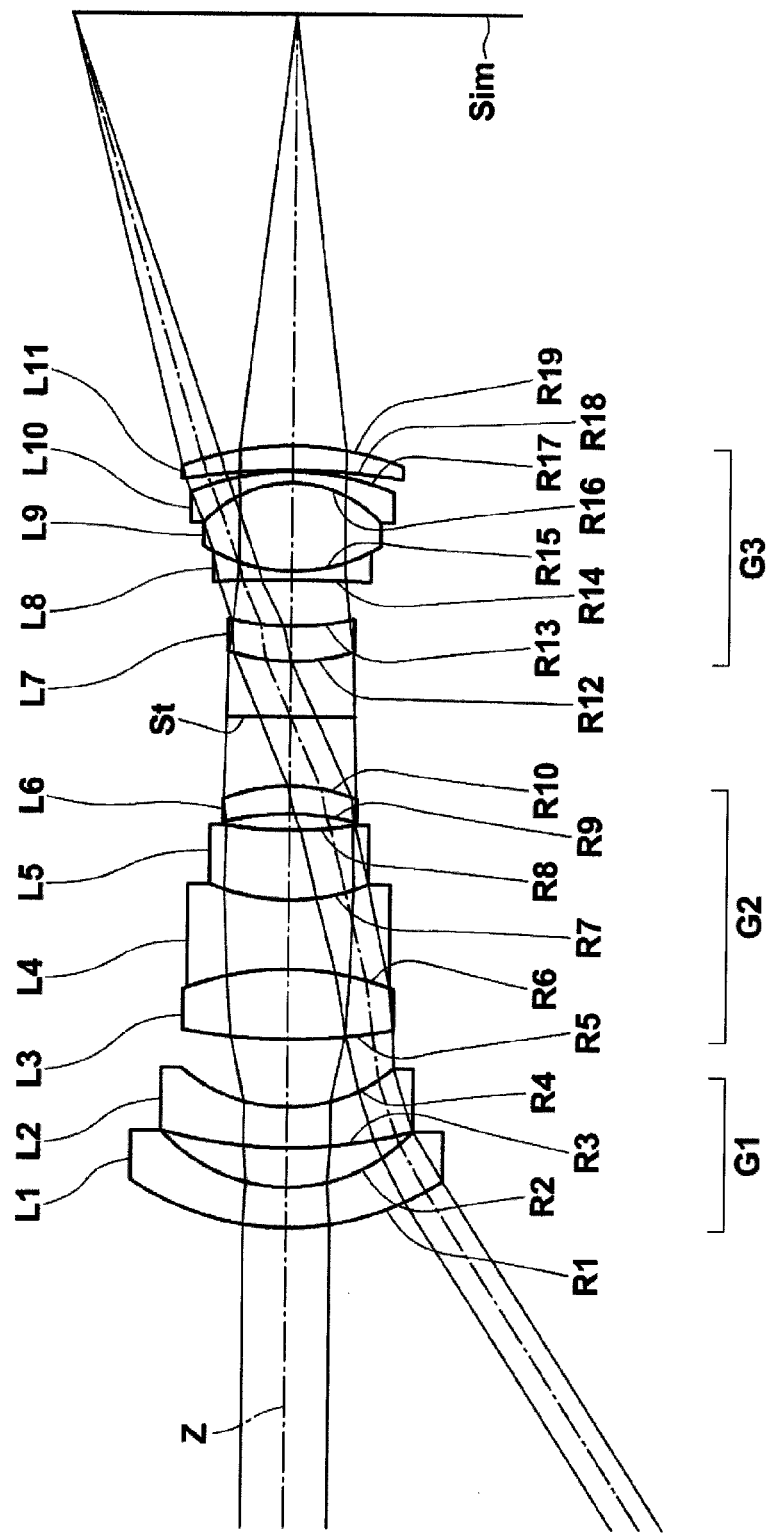
FIG. 2 is a cross section of a retrofocus-type wide angle lens in Example 2 of the present invention illustrating lens structure and optical paths.

Specifically, for example, as illustrated in FIG. 1, the first lens group G1 may have 2-group/2-element structure in which lens L1 and lens L2 are arranged in this order from the object side. The second lens group G2 may have 2-group/4-element structure in which a three-element cemented lens and lens L6 are arranged in this order from the object side. In the three-element cemented lens, three lenses, namely, lenses L3 through lens L5 are cemented together in this order from the object side. The third lens group G3 may have 3-group/5-element structure in which lens L7, a three-element cemented lens and lens L11 are arranged in this order from the object side. In the three-element cemented lens, three lenses, namely, lenses L8 through L10 are cemented together in this order from the object side.

In the example illustrated in FIG. 1, all lenses in the retrofocus-type wide angle lens are grouped into the first lens group G1, the second lens group G2 and the third lens group G3. However, it is not necessary that the retrofocus-type wide angle lens of the present invention is structured in such a manner. For example, when the retrofocus-type wide angle lens is a lens system substantially consisting of lenses L1 through L11 as illustrated in FIG. 1, the second lens group G2 may consist of only three lenses of lenses L3 through L5, and the lens L6 may be regarded as a lens that belongs to none of the first lens group G1, the second lens group G2 and the third lens group G3. Similarly, when the retrofocus-type wide angle lens is a lens system substantially consisting of lenses L1 through L11 as illustrated in FIG. 1, the lens L7 or L11 may be regarded as a lens that belongs to none of the first lens group G1, the second lens group G2 and the third lens group G3.

It is desirable that the three-element cemented lens in the second lens group G2 is composed of a positive lens, a negative lens and a positive lens, which are cemented together in this order from the object side. Particularly, it is desirable that the three-element cemented lens in the second lens group G2 is composed of a positive lens of double-convex shape, a negative lens of double-concave shape and a positive lens having a convex surface facing the object side, which are cemented together in this order from the objet side. When the three-element cemented lens in the second lens group G2 is structured in such a manner, it is possible to correct chromatic aberrations, especially lateral chromatic aberrations, in an excellent manner.

For example, in the second lens group G2 illustrated in FIG. 1, lens L3 is a double-convex lens, and lens L4 is a double-concave lens, and lens L5 is a positive meniscus lens having a convex surface facing the object side. The three-element cemented lens in the second lens group G2 is not limited to the example illustrated in FIG. 1. For example, the lens L5 may be a double-convex lens, as illustrated in FIG. 5.

It is desirable that the three-element cemented lens in the third lens group G3 is composed of a negative lens, a positive lens and a negative lens, which are arranged in this order from the object side. Specifically, in the three-element cemented lens in the third lens group G3, it is desirable that a negative lens having a concave surface facing the image side of the retrofocus-type wide angle lens, a positive lens of double-convex shape, and a negative meniscus lens having a concave surface facing the object side are cemented together in this order from the object side. When the three-element cemented lens in the third lens group G3 is structured in such a manner, it is possible to correct chromatic aberrations, especially lateral chromatic aberrations, in an excellent manner.

For example, in the third lens group G3 illustrated in FIG. 1, lens L8 is a double-concave lens, and the lens L9 is a double-convex lens, and the lens L10 is a negative meniscus lens having a concave surface facing the object side.

When the three-element cemented lens in the second lens group G2 is composed of a double-convex lens, a double-concave lens and a positive lens, which are arranged in this order from the object side, and the three-element cemented lens in the third lens group G3 is composed of a negative lens, a double-convex lens and a negative meniscus lens, which are arranged in this order from the object side, the directions of curves of cemented surfaces on the object side of the aperture stop St become opposite to those of cemented surfaces on the image side of the aperture stop St. Therefore, it is possible to correct lateral chromatic aberrations in an excellent manner.

When the three-element cemented lens in the third lens group G3 is composed of a negative lens, a positive lens and a negative lens, which are cemented together in this order from the object side, it is desirable that at least one of the following formulas (1) and (2) is satisfied:

$$\nu 3p > 75 \quad (1); \text{and}$$

$$Nd31 - Nd32 > 0.13 \quad (2), \text{where}$$

ν3p: Abbe number of the positive lens in the three-element cemented lens in the third lens group G3 with respect to d-line, Nd31: refractive index of one of the two negative lenses in the three-element cemented lens in the third lens group G3, and the one of the two negative lenses having higher refractive index than the other negative lens with respect to d-line, and Nd32: refractive index of the positive lens in the three-element cemented lens in the third lens group G3 with respect to d-line.

When the formula (1) is satisfied, chromatic aberrations are easily corrected. Especially, secondary spectra of longitudinal chromatic aberrations and lateral chromatic aberrations are easily corrected. When the formula (1) is not satisfied, lateral chromatic aberrations for g-line (wavelength is 435.8 nm) are over-corrected.

When the formula (2) is satisfied, it is possible to correct lateral chromatic aberrations at a medium angle of view and lateral chromatic aberrations at a maximum angle of view in a well-balanced manner. When the formula (2) is not satisfied, if lateral chromatic aberrations at the maximum angle of view are corrected in an excellent manner, lateral chromatic aberrations for g-line at the medium angle of view are undercorrected.

For the purpose of correcting chromatic aberrations in a more excellent manner, it is desirable that the three-element cemented lens in the third lens group G3 is composed of a negative lens having a concave surface facing the image side, a positive lens of double-convex shape, and a negative meniscus lens having a concave surface facing the object side, which are cemented together in this order from the object side, and that the formula (1) or (2) is satisfied.

When the three-element cemented lens in the second lens group G2 is composed of a positive lens, a negative lens and a positive lens, which are cemented together in this order from the object side, it is desirable that the following formula (3) is satisfied:

$$Nd21-Nd22>0.15 \quad (3), \text{where}$$

Nd21: refractive index of one of the two positive lenses in the three-element cemented lens in the second lens group G2, and the one of the two positive lenses having higher refractive index than the other positive lens with respect to d-line, and Nd22: refractive index of the negative lens in the three-element cemented lens in the second lens group G2 with respect to d-line.

When the formula (3) is satisfied, it is possible to correct lateral chromatic aberrations at a medium angle of view and lateral chromatic aberrations at a maximum angle of view in a well-balanced manner. When the formula (3) is not satisfied, if lateral chromatic aberrations at the maximum angle of view are corrected in an excellent manner, lateral chromatic aberrations for g-line at the medium angle of view are undercorrected.

For the purpose of correcting chromatic aberrations in a more excellent manner, it is desirable that the three-element cemented lens in the second lens group G2 is composed of a positive lens of double-convex shape, a negative lens of double-concave shape, and a positive lens having a convex surface facing the object side, which are cemented together in this order from the object side, and that the formula (3) is satisfied.

Further, it is more desirable that at least one of the formulas (2-1) and (3-1) is satisfied to correct lateral chromatic aberrations in an excellent manner:

$$Nd31-Nd32>0.23 \quad (2\text{-}1); \text{and}$$

$$Nd21-Nd22>0.25 \quad (3\text{-}1).$$

Further, it is desirable that a meniscus lens having a convex surface facing aperture stop St is arranged between the three-element cemented lens in the second lens group G2 and the aperture stop St. When the retrofocus-type wide angle lens is structured in such a manner, it is possible to easily correct curvature of field in an excellent manner. In the example illustrated in FIG. 1, lens L6, which is a positive meniscus lens having a convex surface facing the aperture stop St, is arranged between the three-element cemented lens in the second lens group G2 and the aperture stop St.

Further, it is desirable that a meniscus lens having a convex surface facing the aperture stop St is arranged between the three-element cemented lens in the third lens group G3 and the aperture stop St. When the retrofocus-type wide angle lens is structured in such a manner, it is possible to easily correct curvature of field in an excellent manner. In the example illustrated in FIG. 1, lens L11, which is a positive meniscus lens having a convex surface facing the aperture stop St, is arranged between the three-element cemented lens in the third lens group G3 and the aperture stop St.

When a meniscus lens having a convex surface facing aperture stop St is arranged between the three-element cemented lens in the second lens group G2 and the aperture stop St, and a meniscus lens having a convex surface facing the aperture stop St is arranged between the three-element cemented lens in the third lens group G3 and the aperture stop St, the symmetricalness of the retrofocus-type wide angle lens with respect to the aperture stop St is improved. Therefore, such structure is advantageous to excellent correction of off-axial aberrations.

In this retrofocus-type wide angle lens, focus may be adjusted by using a rear focus method, in which a rear group in the lens system is moved in focusing. Generally, a lens system that performs focusing by using a rear focus method has higher performance in short-distance photography than a lens system that performs focusing by moving the whole lens system. Further, in the rear focus method, focusing is possible by small drive force. Therefore, a lens system that performs focusing by using the rear focus method is appropriate for a camera or the like including an automatic focus detection apparatus.

In the retrofocus-type wide angle lens in the present embodiment, focus may be adjusted for example by moving the third lens group G3 on an optical axis. Specifically, the retrofocus-type wide angle lens may be structured in such a manner that focus is adjusted from an infinity object to a short distance object by moving the third lens group G3 toward the object side. When focus is adjusted, only the third lens group G3 is moved instead of moving all lens groups. Therefore, a load on a drive mechanism is reduced, and it is possible to contribute to reduction in the size of an apparatus.

For the purpose of obtaining excellent performance when focus is adjusted in a lens system using a rear focus method, it is desirable that lateral chromatic aberrations of a lens group for focusing alone and lateral chromatic aberrations of a lens group or groups that are arranged on the object side of the lens group for focusing have been separately corrected. When the retrofocus-type wide angle lens is structured in such a manner, even if the lens group for focusing is moved to adjust focus, it is possible to suppress fluctuation of lateral chromatic aberrations as much as possible. In the present embodiment, each of the second lens group G2 and the third lens group G3 includes a three-element cemented lens. The lens system is structured in such a manner that lateral chromatic aberrations of the second lens group G2 alone and lateral chromatic aberrations of the third lens group G3 alone are easily corrected. Therefore, even if the rear focus method is adopted, it is possible to suppress the fluctuation of lateral chromatic aberrations during adjustment of focus. Hence, high optical performance is achievable.

Further, it is desirable that the retrofocus-type wide angle lens satisfies the following formula (4):

$$Bf/f>1.1 \quad (4), \text{where}$$

Bf: back focus of entire system, and f: focal length of entire system.

When the formula (4) is satisfied, a long back focus is ensured, and the lens system becomes appropriate for use in a single-lens reflex camera.

Next, a retrofocus-type wide angle lens according to a second embodiment of the present invention will be described. FIGS. 1 through 5 illustrate examples of structure of the retrofocus-type wide angle lens according to the second embodiment.

A retrofocus-type wide angle lens according to the second embodiment of the present invention includes first lens group G1 having negative refractive power as a whole, second lens group G2 having positive refractive power as a whole, aperture stop St, and third lens group G3 having positive refractive power as a whole, which are arranged along optical axis Z in this order from the object side of the retrofocus-type wide angle lens. Further, the second lens group G2 includes a three-element cemented lens, and the three-element cemented lens is composed of a positive lens of double-convex shape, a negative lens of double-concave shape, and a positive lens having a convex surface facing the object side, which are cemented together in this order from the object side. Further, the following formula (3) is satisfied in the three-element cemented lens in the second lens group G2:

$$Nd21-Nd22>0.15 \qquad (3),$$ where

Nd21: refractive index of one of the two positive lenses in the three-element cemented lens in the second lens group G2, and the one of the two positive lenses having higher refractive index than the other positive lens with respect to d-line, and Nd22: refractive index of the negative lens in the three-element cemented lens in the second lens group G2 with respect to d-line.

The structure of the retrofocus-type wide angle lens according to the second embodiment is partially the same as that of the retrofocus-type wide angle lens according to the first embodiment and embodiments thereof. Since the actions and effects of the same structure in the second embodiment are the same as those explained in the first embodiment, explanations are omitted in the second embodiment.

In the retrofocus-type wide angle lens in the second embodiment, the structure of the second lens group G2, which is arranged substantially in the vicinity of the center of the optical system, is especially important. Normally, when lateral chromatic aberrations are tried to be corrected in an excellent manner, efforts are relatively concentrated on the structure of the third lens group G3, which is close to image plane Sim. However, in the retrofocus-type wide angle lens in the second embodiment, higher optical performance is achievable by paying attention to the second lens group G2.

When the second lens group G2 is structured in such a manner to include a three-element cemented lens and the shape of each of the lenses constituting the three-element cemented lens is set as described above, it is possible to make the shapes of two cemented surfaces of the three-element lens in the second lens group G2 as follows. The two cemented surfaces are a convex surface curved out toward the image side (convex toward the image side) and a convex surface curved out toward the object side (convex toward the object side), which are arranged in this order form the object side. Further, when the second lens group G2 is structured in such a manner to satisfy the formula (3), it is possible to correct lateral chromatic aberrations at middle angles of view and lateral chromatic aberrations at a maximum angle of view in a well-balanced manner.

Further, it is more desirable that the following formula (3-1) is satisfied to correct lateral chromatic aberrations in a more excellent manner:

$$Nd21-Nd22>0.25 \qquad (3-1).$$

In the retrofocus-type wide angle lens in the second embodiment, it is desirable that a meniscus lens having a convex surface facing aperture stop St is arranged between the three-element cemented lens in the second lens group G2 and the aperture stop St. When the retrofocus-type wide angle lens is structured in such a manner, it is possible to easily correct curvature of field in an excellent manner. In the example illustrated in FIG. 1, lens L6 is arranged between the three-element cemented lens in the second lens group G2 and the aperture stop St. The lens L6 is a positive meniscus lens having a convex surface facing the aperture stop St.

Further, the first lens group G1 in the retrofocus-type wide angle lens in the second embodiment may include two negative meniscus lenses, each having a convex surface facing the object side. Such structure of the first lens group G1 is advantageous to achievement of a wide angle and a long back focus.

The third lens group G3 in the retrofocus-type wide angle lens in the second embodiment may include at least one three-element cemented lens. When the third lens group G3 is structured in such a manner, it is possible to more easily correct chromatic aberrations, especially lateral chromatic aberrations.

The desirable structure or component and the adoptable structure or component of the retrofocus-type wide angle lens, which were described in the first embodiment, are also applicable to the retrofocus-type wide angle lens in the second embodiment. For example, the retrofocus-type wide angle lens in the second embodiment may be structured also in such a manner that focus is adjusted from an infinity object to a short distance object by moving the third lens group G3 toward the object side.

As illustrated in FIGS. 1 through 5, the retrofocus-type wide angle lenses according to the first embodiment and the second embodiment may be structured in such a manner that all of lenses are spherical lenses, in other words, no aspheric surface is used. Therefore, it is possible to provide a lens system that is low-cost and that has excellent productivity.

When many cemented surfaces are used as in the retrofocus-type wide angle lenses according to the first embodiment and the second embodiment, it is possible to suppress generation of ghost, compared with the case of structuring lens systems using a small number of cemented lens or lenses. The structure including many cemented lenses is advantageous to obtainment of excellent images.

Although FIGS. 1 through 5 do not illustrate, a light blocking means for suppressing generation of ghost may be provided. Alternatively, various filters or the like may be provided between the lens system and image plane Sim.

The retrofocus-type wide angle lens according to the first embodiment and the second embodiment may be used as a single focal lens, in which focal length is fixed. For example, the retrofocus-type wide angle lenses according to the first embodiment and the second embodiment are appropriately as a wide angle lens for a medium-size single-lens reflex camera.

Figure 11:
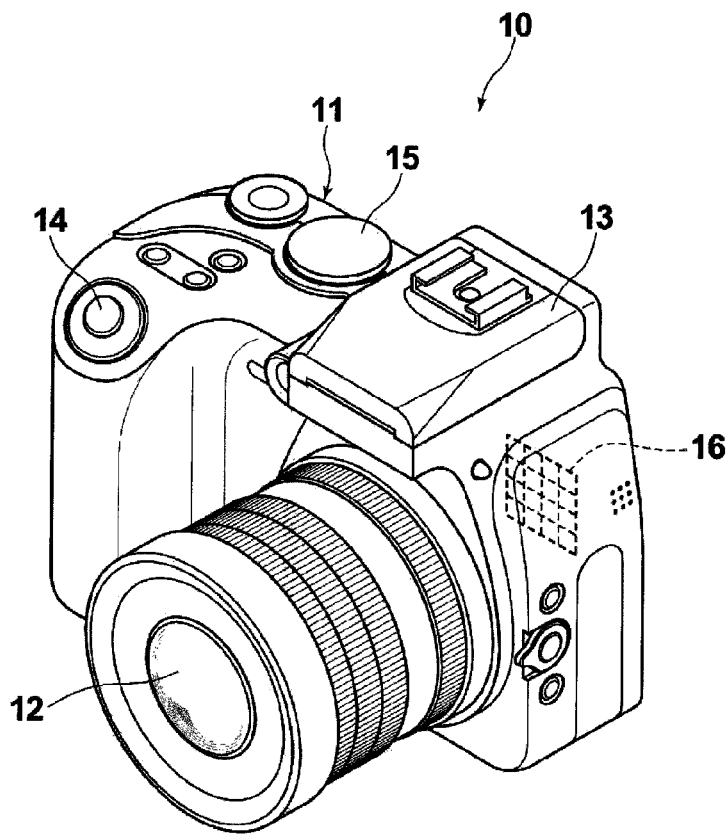
FIG. 11 is a perspective view illustrating the structure of a camera according to an embodiment of the present invention.

FIG. 11 is a perspective view of an example of a camera to which the retrofocus-type wide angle lens of the embodiments of the present invention is applied. A camera 10 illustrated in FIG. 11 is a digital single-lens reflex camera. The camera 10 includes a camera body 11, a retrofocus-type wide angle lens 12, a flash generation apparatus 13, a shutter button 14, and a mode dial 15. The retrofocus-type wide angle lens 12 is mounted on the front side of the camera body 11, and the flash generation apparatus 13 is provided on the upper side of the camera body 11. Further, the camera 10 includes an imaging device 16, such as a CCD and CMOS, in the camera body 11. The imaging device 16 converts an optical image formed by the retrofocus-type wide angle lens 12 into electrical signals.

Next, examples of numerical values of the retrofocus-type wide angle lens of the present invention will be described. FIGS. 1 through 5 are cross sections of the retrofocus-type wide angle lenses in Examples 1 through 5.

Tables 1 through 5 show lens data about the retrofocus-type wide angle lenses in Examples 1 through 5, respectively. In the lens data, column Si shows the surface number of the i-th surface (i=1, 2, 3, . . . ). The most object-side surface of elements constituting the lens system is the first surface, and surface numbers sequentially increase toward the image side. Further, column Ri shows the radius of curvature of the i-th surface, and column Di shows a distance between the i-th surface and (i+1)th surface on optical axis Z. The sign (positive/negative) of the radius of curvature is positive when the surface is convex toward the object side, and negative when the surface is convex toward the image side.

In the lens data, column Ndj shows the refractive index of a j-th optical element (j=1, 2, 3, . . . ) for d-line (wavelength is 587.6 nm). The most-object-side lens is the first optical element, and the number j sequentially increases toward the image side. Further, the column vdj shows the Abbe number of the j-th optical element for d-line. The lens data includes aperture stop St. In the column Si of surface number, the term "(aperture stop)" is also written in a row corresponding to the aperture stop St.

The values in brackets under the tables of lens data are focal length f of the entire system, back focus Bf and full angle $2\omega$ of view. The units of the numerical values are "degrees (°)" for the full angle $2\omega$ of view, and "mm" for lengths. However, these units are only examples. Since an optical system is usable when the optical system is proportionally enlarged or proportionally reduced, other appropriate units may be used. Further, the numerical values in the tables are rounded to predetermined digits.

TABLE 1

EXAMPLE 1

| Si | Ri | Di | Ndj | v dj |
|---|---|---|---|---|
| 1 | 44.666 | 9.20 | 1.83481 | 42.7 |
| 2 | 26.888 | 6.47 | | |
| 3 | 85.626 | 6.50 | 1.84666 | 23.9 |
| 4 | 26.887 | 8.32 | | |
| 5 | 97.855 | 9.89 | 1.88300 | 40.8 |
| 6 | −45.984 | 10.02 | 1.48749 | 70.2 |
| 7 | 33.114 | 9.55 | 1.83481 | 42.7 |
| 8 | 73.760 | 1.85 | | |
| 9 | −47.229 | 4.89 | 1.62041 | 60.3 |
| 10 | −28.844 | 6.75 | | |
| 11 (APERTURE STOP) | ∞ | 7.64 | | |
| 12 | 33.067 | 3.04 | 1.84666 | 23.9 |
| 13 | 47.032 | 7.21 | | |
| 14 | −175.660 | 1.30 | 1.80000 | 29.8 |
| 15 | 29.231 | 12.75 | 1.49700 | 81.5 |
| 16 | −19.077 | 1.63 | 1.70154 | 41.2 |
| 17 | −43.882 | 0.20 | | |
| 18 | −144.900 | 4.35 | 1.83481 | 42.7 |
| 19 | −46.430 | | | |

(f = 50.688, Bf = 61.835, $2\omega$ = 69.3°)

TABLE 2

EXAMPLE 2

| Si | Ri | Di | Ndj | v dj |
|---|---|---|---|---|
| 1 | 45.903 | 5.79 | 1.83481 | 42.7 |
| 2 | 27.505 | 5.59 | | |
| 3 | 77.934 | 5.81 | 1.84666 | 23.8 |
| 4 | 26.730 | 9.68 | | |
| 5 | 95.730 | 9.99 | 1.88300 | 40.8 |
| 6 | −47.642 | 9.99 | 1.48749 | 70.2 |
| 7 | 33.802 | 10.00 | 1.81600 | 46.6 |
| 8 | 70.562 | 2.23 | | |
| 9 | −48.198 | 4.04 | 1.62041 | 60.3 |
| 10 | −28.896 | 9.86 | | |
| 11 (APERTURE STOP) | ∞ | 8.00 | | |
| 12 | 33.642 | 5.00 | 1.84666 | 23.8 |
| 13 | 46.383 | 6.66 | | |
| 14 | −261.750 | 1.29 | 1.75520 | 27.5 |
| 15 | 27.778 | 12.63 | 1.49700 | 81.5 |
| 16 | −19.183 | 1.59 | 1.70000 | 48.1 |
| 17 | −43.227 | 0.20 | | |
| 18 | −118.580 | 3.49 | 1.83481 | 42.7 |
| 19 | −50.249 | | | |

(f = 50.644, Bf = 61.403, $2\omega$ = 69.3°)

TABLE 3

EXAMPLE 3

| Si | Ri | Di | Ndj | v dj |
|---|---|---|---|---|
| 1 | 47.215 | 9.99 | 1.83481 | 42.7 |
| 2 | 27.409 | 4.46 | | |
| 3 | 69.140 | 3.37 | 1.84666 | 23.8 |
| 4 | 23.853 | 9.31 | | |
| 5 | 90.753 | 9.99 | 1.76200 | 40.1 |
| 6 | −41.981 | 10.00 | 1.48749 | 70.2 |
| 7 | 36.067 | 10.00 | 1.75700 | 47.8 |
| 8 | 107.350 | 1.61 | | |
| 9 | −51.859 | 3.94 | 1.62041 | 60.3 |
| 10 | −28.544 | 10.30 | | |
| 11 (APERTURE STOP) | ∞ | 7.68 | | |
| 12 | 30.634 | 5.00 | 1.84666 | 23.8 |
| 13 | 41.579 | 6.73 | | |
| 14 | −365.390 | 1.29 | 1.75520 | 27.5 |
| 15 | 25.245 | 12.80 | 1.49700 | 81.5 |
| 16 | −18.678 | 1.59 | 1.69350 | 50.8 |
| 17 | −41.375 | 0.20 | | |
| 18 | −117.410 | 3.20 | 1.83481 | 42.7 |
| 19 | −54.649 | | | |

(f = 50.69, Bf = 61.431, $2\omega$ = 69.3°)

TABLE 4

EXAMPLE 4

| Si | Ri | Di | Ndj | v dj |
|---|---|---|---|---|
| 1 | 51.852 | 9.68 | 1.83481 | 42.7 |
| 2 | 26.581 | 3.83 | | |
| 3 | 56.498 | 4.31 | 1.84666 | 23.8 |
| 4 | 22.887 | 7.76 | | |
| 5 | 89.771 | 8.68 | 1.70154 | 41.2 |
| 6 | −38.728 | 9.67 | 1.48749 | 70.2 |
| 7 | 35.910 | 10.00 | 1.69350 | 50.8 |
| 8 | 183.360 | 2.91 | | |
| 9 | −60.124 | 4.08 | 1.62041 | 60.3 |
| 10 | −28.180 | 12.10 | | |
| 11 (APERTURE STOP) | ∞ | 7.91 | | |
| 12 | 29.271 | 4.99 | 1.84666 | 23.8 |
| 13 | 36.134 | 6.74 | | |
| 14 | −357.310 | 1.30 | 1.69895 | 30.1 |
| 15 | 24.245 | 13.00 | 1.49700 | 81.5 |
| 16 | −18.299 | 1.59 | 1.70000 | 48.1 |
| 17 | −38.147 | 0.20 | | |
| 18 | −98.268 | 2.70 | 1.83481 | 42.7 |
| 19 | −59.786 | | | |

(f = 50.709, Bf = 61.477, $2\omega$ = 69.3°)

TABLE 5

EXAMPLE 5

| Si | Ri | Di | Ndj | νdj |
|---|---|---|---|---|
| 1 | 53.450 | 7.15 | 1.83481 | 42.7 |
| 2 | 26.920 | 2.96 | | |
| 3 | 44.480 | 4.48 | 1.84666 | 23.8 |
| 4 | 22.410 | 7.08 | | |
| 5 | 124.300 | 9.52 | 1.63930 | 44.9 |
| 6 | −35.870 | 9.99 | 1.48749 | 70.2 |
| 7 | 39.130 | 10.00 | 1.65844 | 50.9 |
| 8 | −11600.000 | 3.71 | | |
| 9 | −61.820 | 4.01 | 1.62041 | 60.3 |
| 10 | −28.890 | 13.90 | | |
| 11 (APERTURE STOP) | ∞ | 8.14 | | |
| 12 | 26.810 | 4.99 | 1.84666 | 23.8 |
| 13 | 30.420 | 6.16 | | |
| 14 | −277.900 | 1.29 | 1.63980 | 34.5 |
| 15 | 22.350 | 14.00 | 1.49700 | 81.5 |
| 16 | −16.640 | 1.59 | 1.63930 | 44.9 |
| 17 | −39.880 | 0.20 | | |
| 18 | −87.650 | 2.32 | 1.83481 | 42.7 |
| 19 | −60.610 | | | |

(f = 50.709, Bf = 61.198, 2ω = 69.3°)

Table 6 shows values corresponding to formulas (1) through (4) in Examples 1 through 5. Each of Examples 1 through 5 satisfies all of formulas (1) through (4).

TABLE 6

| | EXAMPLE 1 | EXAMPLE 2 | EXAMPLE 3 | EXAMPLE 4 | EXAMPLE 5 |
|---|---|---|---|---|---|
| (1) ν3p | 81.5 | 81.5 | 81.5 | 81.5 | 81.5 |
| (2) Nd31-Nd32 | 0.30300 | 0.25820 | 0.25820 | 0.20300 | 0.14280 |
| (3) Nd21-Nd22 | 0.39551 | 0.39551 | 0.27451 | 0.21405 | 0.17095 |
| (4) Bf/f | 1.22 | 1.21 | 1.21 | 1.21 | 1.21 |

FIGS. 6A through 6D, FIGS. 7A through 7D, FIGS. 8A through 8D, FIGS. 9A through 9D, and FIGS. 10A through 10D are diagrams illustrating aberrations of the retrofocus-type wide angle lenses in Examples 1 through 5, respectively. In the following descriptions, the diagrams illustrating aberrations in Example 1 are used as an example to explain the drawings. However, the diagrams illustrating aberrations in other examples are basically similar.

FIGS. 6A, 6B, 6C and 6D are diagrams illustrating aberrations of a retrofocus-type wide angle lens in Example 1 (spherical aberration, astigmatism, distortion and lateral chromatic aberration, respectively). In the diagram illustrating spherical aberration, Fno. represents F-number. In the other diagrams, ω represents a half angle of view. In the diagram illustrating distortion, a shift amount from an ideal image height "f×tan(φ)" is illustrated by using focal length f of the entire system and angle φ of view (variable, 0≤φ≤3). The diagrams of aberrations illustrate aberrations based on d-line (wavelength is 587.56 nm). Further, the diagram of spherical aberration and the diagram of lateral chromatic aberration illustrate aberrations with respect to C-line (wavelength is 656.27 nm) and g-line (wavelength is 435.8 nm).

As the above data show, the retrofocus-type wide angle lenses in Examples 1 through 5 have full angles of view of 70°, which are wide. Further, the back focus is more than or equal to 1.2 times longer than the focal length, which means sufficiently long. Further, since various aberrations, such as lateral chromatic aberrations, are corrected in an excellent manner, the retrofocus-type wide angle lenses have high optical performance.

So far, the present invention has been described by using embodiments and examples. However, the present invention is not limited to the aforementioned embodiments nor examples, and various modifications are possible. For example, the values of the radius of curvature, a distance between surfaces, refractive index, and Abbe number are not limited to the values in the examples of numerical values, but may be other values.

In the embodiment of a camera, a case of applying the retrofocus-type wide angle lens to a digital single-lens reflex camera was described, but the use of the present invention is not limited to this example. For example, the retrofocus-type wide angle lens of the present invention may be applied also to a video camera, a film camera, and the like.

What is claimed is:

1. A retrofocus-type wide angle lens comprising:
a first lens group having negative refractive power as a whole;
a second lens group having positive refractive power as a whole;
a stop; and
a third lens group having positive refractive power as a whole, which are arranged in this order from the object side of the retrofocus-type wide angle lens,
wherein the first lens group includes two negative meniscus lenses, each having a convex surface facing the object side, and
wherein each of the second lens group and the third lens group includes a three-element cemented lens.

2. A retrofocus-type wide angle lens, as defined in claim 1, wherein the three-element cemented lens in the third lens group is composed of a negative lens having a concave surface facing the image side of the retrofocus-type wide angle lens, a positive lens of double-convex shape, and a negative meniscus lens having a concave surface facing the object side, which are cemented together in this order from the object side.

3. A retrofocus-type wide angle lens, as defined in claim 1, wherein the three-element cemented lens in the second lens group is composed of a positive lens of double-convex shape, a negative lens of double-concave shape, and a positive lens having a convex surface facing the object side, which are cemented together in this order from the object side.

4. A retrofocus-type wide angle lens, as defined in claim 1, wherein the three-element cemented lens in the third lens group is composed of a negative lens, a positive lens, and a negative lens, which are cemented together in this order from the object side, and
wherein the following formula (1) is satisfied:

$$\nu 3p > 75 \qquad (1), \text{where}$$

ν3p: Abbe number of the positive lens in the three-element cemented lens in the third lens group with respect to d-line.

5. A retrofocus-type wide angle lens, as defined in claim 1, wherein the three-element cemented lens in the third lens group is composed of a negative lens, a positive lens, and a negative lens, which are cemented together in this order from the object side, and wherein the following formula (2) is satisfied:

$$Nd31-Nd32>0.13 \qquad (2), \text{where}$$

Nd31: refractive index of one of the two negative lenses in the three-element cemented lens in the third lens group, and the one of the two negative lenses having higher refractive index than the other negative lens with respect to d-line, and Nd32: refractive index of the positive lens in the three-element cemented lens in the third lens group with respect to d-line.

6. A retrofocus-type wide angle lens, as defined in claim 1, wherein the three-element cemented lens in the second lens group is composed of a positive lens, a negative lens, and a positive lens, which are cemented together in this order from the object side, and wherein the following formula (3) is satisfied:

$$Nd21-Nd22>0.15 \qquad (3), \text{where}$$

Nd21: refractive index of one of the two positive lenses in the three-element cemented lens in the second lens group, and the one of the two positive lenses having higher refractive index than the other positive lens with respect to d-line, and Nd22: refractive index of the negative lens in the three-element cemented lens in the second lens group with respect to d-line.

7. A retrofocus-type wide angle lens, as defined in claim 1, wherein a meniscus lens having a convex surface facing the stop is arranged between the three-element cemented lens in the second lens group and the stop.

8. A retrofocus-type wide angle lens, as defined in claim 1, wherein a meniscus lens having a convex surface facing the stop is arranged between the three-element cemented lens in the third lens group and the stop.

9. A retrofocus-type wide angle lens, as defined in claim 1, wherein focus is adjusted from an infinity object to a short distance object by moving the third lens group toward the object side.

10. A camera comprising:
a retrofocus-type wide angle lens, as defined in claim 1.

* * * * *